United States Patent [19]
Schnee et al.

[11] 3,914,523
[45] Oct. 21, 1975

[54] AMINOPLAST RESIN MODIFIED WITH METHYLENE BISFORMAMIDE AND LAMINATED THERMOSETTING DECORATIVE SHEETS

[75] Inventors: Karl Schnee, Dornigheim; Steffen Piesch, Oberursel; Dieter Tichy, Frankfurt am Main, all of Germany

[73] Assignee: Cassella Farbwerke Mainkur Aktiengesellschaft, Germany

[22] Filed: Jan. 15, 1974

[21] Appl. No.: 433,525

Related U.S. Application Data

[63] Continuation-in-part of Ser. No. 294,953, Oct. 4, 1972, abandoned.

[30] Foreign Application Priority Data

Oct. 7, 1971  Germany............................ 2149970

[52] U.S. Cl......... 428/528; 260/29.4 R; 260/67.6 R; 260/69 N; 260/69 F; 260/70 R; 428/530
[51] Int. Cl.² ........... B32B 21/08; B32B 23/08; B32B 27/42
[58] Field of Search...... 260/67.6 R, 70 R; 161/257, 161/259, 261, 263

[56] References Cited
UNITED STATES PATENTS
2,475,846   7/1949   Lundberg..................... 260/72 R X
3,198,660   8/1965   Vail et al. ........................ 117/139.4

Primary Examiner—Howard E. Schain
Attorney, Agent, or Firm—Connolly and Hutz

[57] ABSTRACT

A modified aminoplast resin which is the condensation product of an aminoplast constituent and a carbonyl compound having added thereto, either before, during or after said condensation, 0.5 to 40% by weight, based on the solids contents of the finished modified resin and calculated as methylene bisformamide, of at least one member selected from the group consisting of methylene bisformamide and the methylolation products thereof and a laminated thermosetting decorative sheet employing said modified aminoplast resin as a resin impregnant for the decorative top layer carrier in the manufacture of the laminated thermosetting decorative sheet.

6 Claims, No Drawings

AMINOPLAST RESIN MODIFIED WITH METHYLENE BISFORMAMIDE AND LAMINATED THERMOSETTING DECORATIVE SHEETS

This is a continuation-in-part of application Ser. No. 294,953 filed on Oct. 4, 1972 and now abandoned.

The invention relates to a modified aminoplast resin which is particularly well suited for impregnating the surface or top layers in the preparation of laminated products. The invention relates furthermore to a rigid laminated product whose surface or top layer is impregnated with the thermohardened, modified aminoplast resin, containing methylene bisformamide or methylolation products thereof.

Aminoplast resins are resin-like products and solutions thereof which result from the condensation of amino or imino group-containing compounds, the so-called aminoplast constituents and carbonyl compounds.

Rigid laminated products in the scope of this invention are self-supporting products which are defined in the N.E.M.A. — Standards Publication LD1 — 1971 (N.E.M.A. National Electrical Manufacturer Association) as Laminated Thermosetting Decorative Sheets. These sheets consist essentially of several layers of a fibrous sheet material, such as paper, impregnated with a thermosetting condensation resin and consolidated under heat and pressure. The top layers are white or have a decorative color or a printed design.

The core of the laminated thermosetting decorative sheets may also consist of wood fiber or wood particles consolidated under heat and pressure and bonded by natural or synthetic resins. Laminated products with such a core are defined in the above mentioned N.E.M.A. — Standards Publication LD1 — 1971 as type 4 named Hardboard-Core-Type.

Abroad, for example, in Germany distinction is made between another two sub-types of this hardboard-core-type, viz., the so-called "wood-fiber hardboard" and the "laminated chip-board", according as the core consists of wood-fibers or wood-chips. All these laminated thermosetting decorative sheets are self-supporting and have attractive, exposed surfaces which are durable and resistant to damage from abrasion and mild alkalies, acids and solvents. Laminated thermosetting decorative sheets are available with white surfaces or with surfaces in a wide variety of colors, decorative designs and surface finishes. They are used for good appearance and functional performance under hard service, such as counter and table tops, bathroom and kitchen work surfaces, furniture and cabinets, wall paneling and partitions, doors and the like.

References to the manufacture of laminated thermosetting decorative sheets are made, e.g., in John F. Blais "Amino Resins", Reinhold Publishing Corporation, New York (1959) pages 122–138 and in C.P. Vale "Aminoplastics", Cleaver Hume Press Ltd., London (1950), pages 209–214.

In the preparation of laminated thermosetting decorative sheets, the fibrous sheet forming later the decorative top layer is impregnated with a suitable aminoplast resin, preferably melamine resin or melamine-urea resin and, subsequent to drying, pressed onto a layer of several paper webs impregnated with phenol resin or onto a board consisting of wood fibers or wood chips, by applying pressure and heat. The amount of pressure applied in this connection may be 10 to 100 kp/cm$^2$ and the temperature 120° to 180°C. During the pressing process, the aminoplast hardens and bonds the decorative sheet compactly onto the backing sheet. The laminated thermosetting decorative sheets obtained are rigid and self-supporting and are distinguished by their good chemical and physical properties. The non-plasticized aminoplasts used for impregnating the surface sheets have a negligible elasticity in the cured state. As a consequence, surfaces prepared from these resins have a tendency to cracking.

There have been a number of attempts to eliminate or to lessen the deficient elasticity of the decorative surface of the laminated thermosetting decorative sheets by introducing additives into the impregnating resins for the decorative sheets of the top layer. Polyalcohols, sorbitol and sugar as well as aromatic sulfonamides have been particularly recommended as additives. In the addition of polyalcohols or sugars, however, resistance to water of the hardened resins becomes insufficient if the elasticity is sufficient. Sulfonamides alone do not suffice for achieving good elasticity.

All these additions were, thus, not fully satisfactory. On that account it has so far not been possible to obtain laminated thermosetting decorative sheets which, in addition to a faultless, uniform and even, smooth and cured surface having an outstanding gloss, show simultaneously an exceptional elasticity and an excellent resistance to water or steam and meet the other standards of the criteria, e.g., insensitivity to stains, more particularly to acids. The elasticity may be determined by the susceptivity to cracking measured according to DIN (German Industrial Standard) 53 799 figure 4.7 or to Draft -DIN 68 765.

It has surprisingly been found that laminated thermosetting decorative sheets can be made that fulfill all the aforesaid conditions if the sheets provided for the decorative top layer are impregnated with a novel aminoplast resin and subsequently are laminated in a known manner to the wood-chip or wood fiber board or to the multiple layers of that material to form the laminated thermosetting decorative sheets.

The novel aminoplast resin is characterized by a content of methylene bisformamide and/or its methylolation products and/or their reaction products with the resin constituents.

For the preparation of the novel aminoplast resin, an aminoplast constituent is condensed in a known manner with a carbonyl compound and prior to, during or after the condensation, methylene bisformamide and/or a methylolation product of the methylene bisformamide is added.

Methylene bisformamide has the formula

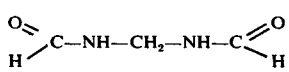

and may be prepared, for example, by heating 2 mol formamide with 1 mol formaldehyde in the form of paraformaldehyde according to the process of Knudsen, *Berichte der Deutschen Chemischen Gesellschaft*, Vol. 47 (1914), p, 2699. Another process of preparation for the methylene bisformamide is disclosed in US Pat. No. 2,713,594 or in the *Journ. Am. Chem. Soc.* (1955), p. 2559. Pure methylene bisformamide has a melting point of 144°C. Methylene bisformamide may be used in the frame of the present invention also in the form of the raw product obtained by one of the cited reference without further purification, e.g., also in the form of an oily raw product.

As starting products for the preparation of the aminoplast resin, all known aminoplast constituents and all carbonyl compounds known for condensation with aminoplast constituents are suitable. Examples of the former include urea, thiourea, dicyanodiamide, guanamines such as aceto or benzo-guanamines and melamine. Melamine is preferred. Examples of the latter include acetaldehyde, butyraldehyde, iso-butyraldehyde, acetone, methyl-ethyl-ketone, aromatic aldehydes and ketones and formaldehyde. Formaldehyde is preferred. Also mixtures of aminoplast constituents and/or of carbonyl compounds may be used for the preparation of the aminoplast resin. Melamine-formaldehyde-condensation products and their mixed condensates or mixtures with other constituents, preferably urea and formaldehyde are especially useful for the preparation of the novel resins.

The methylene bisformamide and/or the methylolation products of the methylene bisformamide may be added to the modified resin prior to, during or after a completed condensation. 0.5 to 40% by weight methylene bisformamide, normally 1 to 25% by weight, and preferably 5 to 15% by weight, referring to the solids content of the finished resin are added.

The methylene bisformamide or its methylolation products may also be added in the form of aqueous solutions. The addition of methylene bisformamide or its aqueous solutions is preferred. In the use of methylene bisformamide, the addition occurs toward the end of the condensation for the sake of expediency but preferably, after a completed condensation, to the cooled resin solution. It is also possible to add a portion of the methylene bisformamide at the beginning of the condensation and the rest during or after the condensation. In the event methylolation products of methylene bisformamide are used, it is suitable first to convert the methylene bisformamide with formaldehyde to a methylolation product or a mixture of the methylolation products, and after a subsequent addition of the aminoplast former and the carbonyl compound, to undertake the condensation of the resin. If the addition of the methylene bisformamide and/or of the methylolation product of methylene bisformamide occurs prior to or during the condensation of the resin, then at least a portion reacts with the resin constituents. The novel aminoplast contains 0.5 to 40% by weight, normally 1 to 25% by weight and preferably 5 to 15% by weight methylene bisformamide and/or methylolation products of methylene bisformamide and/or their reaction products with the resin formers, based on the solids content of the aminoplast and calculated as methylene bisformamide.

There may also be added to the novel aminoplast resin salts of weak to strong organic acids, e.g., diethanolaminoacetate, ethanolamine hydrochloride, ethylene diaminoacetate, ammonium rhodanide, ammonium lactate or ethylene diaminophosphate in order to accelerate the hardening without thereby deteriorating the elasticity and the other outstanding properties of the top layer of the laminated thermosetting decorative sheets.

In the preparation of the resins there may also be added other modifiers, such as mono or dialcohols, sugar, salts of the amidosulfonic acid, aromatic sulfonic acid amides and the like.

The condensation of the resin is, as a rule, continued up to a limited water-dilutability. In the determination of the water-dilutability it is found out as to how many parts by volume of water can be titrated at 20°C. by one part by volume of resin without any amount of resin being deposited. To realize this procedure the resin is titrated with the aid of water. The proportion of "water-dilutability: $1:x$" as given implies that 1 ml. resin is capable of mixing up $x$ ml. of water at 20°C without any turbidity occurring. The condensation conditions are entirely equal to those of the known amino resins and are, of course, well known to those skilled in the art. Further particulars on the production of prior art amino resins are given in numerous publications, for instance, in Kirk-Othmer: "Encyclopedia of Chemical Technology" Vol. 1 (1947), pages 756–759 and Houben-Weyl: "Methoden der organischen Chemie", Vol XIV/2 "Makromolekulare Stoffe — part 2" published in 1963 by Georg Thieme Verlag Stuttgart — more particularly pages 346–357 (Urea condensation products), pages 357–371 (Melamine condensation products), pages 382– 388 (Condensation products of Dicyandiamide and Guanadine), and the monographs referred to above of John F. Blais "Amino Resins" and C.B. Vale "Aminoplastics". The condensation conditions are further illustrated by the Working Examples mentioned hereinafter.

The preparation of the laminated thermosetting decorative sheets using the novel aminoplast resins occurs in such a manner that the sheet for the deocrative top layer is impregnated with the novel aminoplast resin and is further processed in a manner known per se. Thus, for the decorative top layer paper or a fabric web, preferably based on cellulosic material or mixtures thereof with other organic or inorganic fiber material may be used and the impregnated and dried paper or fabric web is pressed onto the prepared wood-chip or wood-fiber board or onto the multiple sheets of filler material under pressures of 10 to 100 kp/cm² and temperatures of 120° to 180°C., multiple level presses being preferably used for the pressing. In the preparation of hardboard-core-type laminated thermosetting decorative sheets with a core of wood-chips, temperatures of 150°C, pressures of 20 kp/cm² and pressure times of 6 minutes are normally used. In the preparation of hardboard-core-type laminated thermosetting decorative sheets with a core of wood fibers temperatures of 160°C, pressures of 40 kp/cm² and pressure times of 8 minutes are normally used. In the preparation of laminated thermosetting decorative sheets, which contain as filler material several layers of paper impregnated with phenolic resin, temperatures of 140°C, pressures of 100 kp/cm² and pressure times of 10 minutes are normally used.

The thusly prepared laminated thermosetting decorative sheets are distinguished, for example, in that the surfaces are unobjectionably cured and notwithstanding have a high gloss, a great elasticity and a high resistance to steam. They, therefore, meet high standards in the testing according to the Kiton-Test (to determine the curing criterion, the Kiton-Test is described in examples referred to hereinafter) in the testing of their behavior towards steam (in accordance with DIN (German Industrial Standards) 53 799, figure 4.11) and in the testing of their behavior towards the susceptivity to cracking (in accordance with DIN 53 799, figure 4.7.1, or Draft-DIN 68 765) as well as in the testing of their insusceptivity to stains (in accordance with DIN 53 799, figure 4.11, in the presence of hydrochloric acid). Thus, they do not show any cracks, e.g., when testing the susceptivity to cracks in accordance with DIN 53 799, figure 4.7., or in accordance with Draft-DIN 68 765, in many instances they do not, even if the test conditions in comparison with the DIN-Standards are tightened by storing the test specimen at a temperature higher than that as prescribed.

If attempts are made to prepare laminated thermosetting decorative sheets in such a manner that the decorative sheet for the top layer is impregnated with a solution of methylene bisformamide (in the absence of aminoplast resin) and the laminate is finished in the conventional fashion, then entirely unsatisfactory results are obtained. Although the testing of the susceptivity to cracking is even a satisfactory one, the surface, however, turns yellow, has no gloss, is insufficiently bonded to the backing sheet, is uncured and, when tested with regard to its behavior towards steam and with respect to its insusceptivity to stains shows so poor qualities that the products thus obtained are unsuitable for practicable use as laminated thermosetting decorative sheets.

EXAMPLE 1

A mixture of:

| | |
|---|---|
| 94 | kg formaldehyde (39% aqueous solution) |
| 77 | kg melamine |
| 1.8 | kg amidosulfonic acid sodium salt |
| 9.5 | kg methanol and |
| 0.31 | kg soda lye (33% aqueous solution) | was condensed about 4 hours at 90° to 95°C. up to a water dilutability of 1:2. Subsequently, 20.5 kg methylene bisformamide and 37 kg. water as well as 62.5 g diethylethanol aminoacetate were added to the cooled amino resin solution.

In this resin solution, a decorative paper weighing about 80 g/m² and prepared from pure cellulose was impregnated in an impregnator with an lay-on-air system drying oven to an end weight of about 200 g/m² and a volatile content of 5.5 to 7.0%. The volatile content was determined by weighing a specimen prior to and subsequent to a 5-minute drying at a temperature of 160°C. The dried papers were subsequently pressed onto 16 mm thick wood-chip boards having a density of 700 kg/m³ in multiple stage presses with a pressure of 18 to 22 kg/cm² at a temperature of 145°C. The residence time in the press was 8 minutes. Thereafter, the press was cooled to 70°–80°C and opened.

The surface of the hard board-core type laminated thermosetting decorative sheets did not show any cracks when tested with regard to the susceptivity to cracking in accordance with Draft DIN 68 765 or DIN 53 799, figure 4.7.2., the storage of the test specimen being effected at 80°C. for 20 hours. Accordingly, the surface possesses an outstanding elasticity. When tested in accordance with the Kiton Test, the surface was unobjectionably cured, which is the best grading 1. In the case of laminated thermosetting decorative sheets with a core of wood chips the Kiton Test is conducted as follows:

Under a clock glass having a diameter of roughly 3 cm. a 1-milliliter solution of the following composition:

| | |
|---|---|
| 1 | l. water |
| 20 | ml. conc. sulfuric acid |
| 20 | ml. of 2% aqueous solution of Kitonechtrot 2 BL (see C.I. Acid Red 45) | is allowed to act for 2 hours. Thereupon the grade of coloring is compared with that shown on a six-grade scale according to which grade 1 indicates no coloring
grade 6 indicates considerable coloring Grade 1 is attributable to an unobjectionable curing and grade 6 to a poor curing. When tested, the gloss of the surface and its behavior towards steam and its insusceptivity to hydrochloric acid stains were likewise exceptional.

EXAMPLE 2

The preparation of the amino resin solution of Example 1 was repeated with the exception that the methylene bisformamide was omitted. The prepared amino resin solution was used to prepare a decoratively coated wood-chip board in accordance with the procedure of Example 1.

When tested in accordance with Draft DIN 68 765 or DIN 53 799, figure 4.7.2. with regard to the susceptivity to cracking, the storage of the test specimen being likewise effected at 80°C. for 20 hours, the surface of the hardboard-core type laminated thermosetting decorative sheet showed a clear crack formation over its total surface.

EXAMPLE 3

A mixture of

| | |
|---|---|
| 163 | kg formaldehyde (39% aqueous solution) |
| 100 | kg melamine and |
| 0.45 | kg soda lye (33% aqueous solution) | was condensed at 90°C. up to a water dilutability of 1:2. After a 3 ½ hour condensation time, 24.5 kg. methylene bisformamide were added. After the solution was cooled to room temperature, 41 l. water and 65 g. ethanolamine hydrochloride were added.

In this solution, a decorative paper weighing 120 g/m² was impregnated to an end weight of 270 to 290 g/m² and a volatile content of 6.5% and dried. Further processing took place as in Example 1.

The thusly prepared hardboard-core-type laminated thermosetting decorative sheets showed no cracks after testing, which was carried out as described in Example 1. The Kiton-Test was good.

EXAMPLE 4

The preparation of the amino resin solution according to Example 3 was repeated with the exception that methylene bisformamide was omitted. With the resin solution obtained, the decorative paper weighing 120 g/m² was impregnated, as in Example 3, to an end weight of 270 to 290 g/m² and a volatile content of 6.5% and dried. Further processing took place as in Example 1.

When tested in accordance with Draft-DIN 68 765 or DIN 53 799, figure 4.7.2 with regard to the susceptivity to cracking, the storage of the test specimen being likewise effected at 80°C. for 20 hours, the surface of the hardboard-core-type laminated thermosetting decorative sheet showed a distinct crack formation over the entire surface.

EXAMPLE 5

Formaldehyde (403 g) in the form of a 39% aqueous solution and 66.5 methylene bisformamide were agitated for 4 hours at 85°C. The pH of the dimethylol methylene bisformamide and formaldehyde-containing solution was 5.5. After cooling to 40°C., the pH was adjusted to 8.6 with 2N sodium hydroxide solution and 130 g methanol, 315 g. melamine and 100 g. water were added. Under a constant control of the pH, which should be 8.5 to 9.2, condensation proceeded to a water dilutability of 1:1.5 while stirring at 85°C. There was obtained a clear solution having a solids content of about 65%.

After diluting with water to a concentration of about 52%, an overlay paper, about 30 g/m$^2$ (a highly transparent paper consisting of α-cellulose), was impregnated in the solution to an end weight of 100 to 105 g/m$^2$ and a volatile content of 6.5 to 7.0%, and a decorative paper weighing 120 g/m$^2$ was impregnated in the solution to an end weight of 200 to 210 g/m$^2$ and a volatile content of 5.5% and dried. A laminated product was prepared together with soda kraft paper impregnated with phenol-formaldehyde resin (Commercial resin "Phenodur" of Messrs. Reichhold Albert Chemie, Hamburg) in the following arrangement:

1 overlay paper
1 decorative paper
9 phenol-resin-impregnated kraft papers
1 separating foil (siliconized paper).

Pressing took place for 8 minutes at 140°C. and a pressure of 80 kp/cm$^2$. Prior to opening the mold, it was cooled down to 70° to 80°C. The prepared laminated thermosetting decorative sheets showed no crack formation, after testing the susceptivity to cracking, which was carried out according to DIN (Ger. Ind. Standards) 53 799, figure 4.7.1.

Testing in accordance with the Kiton Test resulted in grading 1 that is best, i.e., the surface is unobjectionably cured. As regards laminated thermosetting decorative sheets having a core of a woodfiber board or a multiple layer of sheets of fiber material the Kiton Test is conducted as follows:

Half of the material on test is immersed in a boiling solution of the following composition:
1 l. water
5 ml. conc. sulfuric acid
1 ml. of 2% aqueous solution of Kitonechtrot 2 BL (See C.I. Acid Red 45)
for 10 minutes.

Thereafter the grade of coloring is compared with that shown on a six-graded scale according to which
grade 1 indicates no coloring
grade 6 indicates considerable coloring
Grade 1 is attributable to an unobjectionable cure and grade 6 to a poor cure.

When tested, the gloss of the surface and its behavior towards steam and its insusceptivity to hydrochloric acid stains were likewise exceptional.

EXAMPLE 6

Formaldehyde (326 g) in the form of 39% aqueous solution, 315 g melamine, 130 g methanol and 100 g water were standardized with 2N sodium hydroxide to a pH of 8.6 and condensed with constant control of the pH, which should be 8.5 to 9.2, up to a water dilutability of 1:1.5 while stirring at 85°C. There was obtained a clear solution having a solids content of about 65%.

After diluting with water to a concentration of about 52%, an overlay paper and a decorative paper were impregnated with the solution, dried and processed to a laminated plate in accordance with the procedure of Example 5.

After testing the susceptivity to cracking, which was carried out as depicted in Example 5, the laminated thermosetting decorative sheet prepared showed a crack formation and the grading according to the Kiton-Test was only 2.

EXAMPLE 7

A mixture of 250 g methylene bisformamide, 390 g formaldehyde in the form of a 39% aqueous solution and 500 mg potassium hydrogen carbonate was agitated for 4 hours at 85°C. The pH of the clear solution of dimethylol methylene bisformamide at the end of the reaction time was 6.5.

The solution was cooled to 40°C., and the pH was standardized to 8.5 to 9.0 with 2N sodium hydroxide. Then 705 g formaldehyde in the form of a 39% aqeous solution, 230 g methanol, and 770 g melamine were added. The mixture was heated to 85°C. and condensed to a water dilutability of 1:1 under constant supervision (the pH should be between 8.5 and 9.2). The end content of the solution was 60%, the viscosity 30 seconds according to 4 Ger. Ind. Standards 53 211.

The solution obtained was standardized with water to a concentration of 52% and a decorative paper weighing 120 g/m$^2$ was impregnated to an end weight of 280 to 290 g/m$^2$ and a volatile content of 5 to 6.5%. With this impregnated paper a wood-chip board was laminated in accordance with the procedure of Example 1.

When tested in accordance with Draft-DIN 68 765 or DIN 53 799, figure 4.7.2. with regard to the susceptivity to cracking, the storage of the test specimen being likewise effected at 80°C for 20 hours, the surface of the hardboard-core-type laminated thermosetting decorative sheet showed no cracks. When tested the gloss of the surface and its behavior towards steam and its insusceptivity to hydrochloric acid stains were likewise exceptional.

In place of the method of producing dimethylol methylene bisformamide used above, the dimethylol methylene bisformamide may also be prepared in the following manner: 150 g. paraformaldehyde (2 moles) together with 255 g. methylene bisformamide are stirred at 145°C. until a limpid melt is formed. This melt is miscible with water in any degree. The dimethylol methylene bisformamide thus obtained may be further processed as described in the second paragraph of this Example.

Monomethylol methylene bisformamide is obtained, if 75 g. paraformaldehyde and 255 g. methylene bisformamide are stirred at 145°C. until a limpid melt is formed. In the second paragraph of this Example monomethylol methylene bisformamide may be used in place of the dimethylol methylene bisformamide; in this case it yields similar results.

EXAMPLE 8

A mixture of:

1095 g formaldehyde (in the form of a
   39% aqueous solution)
230 g methanol and
770 g melamine were standardized with 2N sodium hydroxide to a pH of 8.5 to 9.0 and was condensed under constant pH supervision (the pH value should be between 8.5 and 9.2), to a water dilutability of 1:1. The end content of the solution was 60%; the viscosity 30 seconds according to 4 Ger. Ind. Standards 53 211.

The solution obtained was standardized with water to a concentration of 52% and with it a decorative paper was impregnated and a wood-chip board laminated therewith according to the procedure of Example 1.

When tested in accordance with Draft-DIN 68 765 or DIN 53 799, figure 4.7.2., with regard to the susceptivity to cracking, the test specimen even on a storage of 20 hours at a temperature of only 70°C. showed a clear crack formation.

EXAMPLE 9

A mixture of:

940 g formaldehyde (39% aqueous solution)
770 g melamine
230 g methanol
20 g methylene bisformamide and
3 ml 2N sodium hydroxide was heated within 40 minutes to 85°C. with stirring and under constant control of the pH, which should be 8.5 to 9.2, and was condensed at this temperature until the dilutability with water was 1.3. The content of the clear solution was 58% and the viscosity 20 seconds according to 4 Ger. Ind. Standards 53 211. Then an additional 140 g methylene bisformamide was stirred into the cooled solution.

After diluting with water to a concentration of 54%, a decorative paper weighing 80 g/m² was impregnated with the resin solution obtained and laminated onto a wood-chip board as described in Example 1. The hardboard-core-type laminated thermosetting decorative sheet showed properties similar to those of the laminates according to Example 1.

EXAMPLE 10

The preparation of the amino resin solution of Example 9 was repeated with the exception that the methylene bisformamide was omitted. Using a resin solution diluted to a concentration of 54%, a wood-chip board was laminated in accordance with the procedure of Example 1. When tested in accordance with Draft-DIN 68 765 or DIN 53 799, figure 4.7.2., with regard to the susceptivity to cracking, the test specimen even on a storage of 20 hours at a temperature of only 70°C. showed a clear crack formation.

EXAMPLE 11

Formaldehyde (940 g) in the form of a 39% aqueous solution and 150 g methylene bisformamide were agitated for 4 hours at 85°C. The pH of the dimethylol bisformamide and formaldehyde-containing solution was 5.5. After cooling to 40°C., the pH was standardized with 2N sodium hydroxide to 8.5 and 230 g methanol and 770 g melamine were added. Under constant supervision of the pH, which should be 8.5 to 9.2, this mixture was condensed at 85°C. while stirring until the dilutability with water was 1:0.5. A clear solution with a solids content of 65% and a viscosity of 22 seconds according to 4 Ger. Ind. Standards 53 211 was obtained.

After diluting with water, decorative papers were laminated onto wood fiber boards using a procedure similar to that of Example 1. The laminated products showed properties similar to those of the laminates of Example 1.

EXAMPLE 12

A mixture of:

940 g formaldehyde in the form of a
   39% aqueous solution
230 g methanol and
770 g melamine was standardized with 2N sodium hydroxide to a pH of 8.5. Under a constant supervision of the pH, which should be between 8.5 and 9.2, the mixture was condensed to a water dilutability of 1:0.5 while stirring at 85°C.

There was obtained a clear solution with a solids content of about 60% and a viscosity of 22 seconds, measured according to 4 Ger. Ind. Standards 53211.

After diluting with water, decorative papers were laminated onto wood-fibre boards using a procedure similar to that of Example 1.

When tested with regard to the susceptivity to cracking in accordance with DIN 53799, figure 4.7., the storage of the test-specimen being effected at 70°C. for 20 hours, cracks were determined on the surface.

We claim:

1. A laminated thermosetting decorative sheet, the decorative top layer of which is impregnated with a thermohardened, modified aminoplast resin which is the condensation product of an aminoplast constituent and a carbonyl compound having added thereto, either before, during or after said condensation, 0.5 to 40% by weight, based on the solids content of the finished modified resin and calculated as methylene bisformamide, of at least one member selected from the group consisting of methylene bisformamide and the methylolation products thereof.

2. The laminated thermosetting decorative sheet of claim 1 wherein said solids content is from 1 to 25% by weight.

3. The laminated thermosetting decorative sheet of claim 1 wherein said solids content is from 5 to 15% by weight.

4. The laminated thermosetting decorative sheet of claim 1 wherein said aminoplast constituent is urea, thiourea, dicyanodiamide, acetoguanamide, benzoguanamine or melamine.

5. The laminated thermosetting decorative sheet of claim 1 wherein said carbonyl compound is formaldehyde, acetaldehyde, butyraldehyde, iso-butyraldehyde, acetone or methyl-ethyl-ketone or mixtures thereof.

6. The laminated thermosetting decorative sheet of claim 1 wherein said aminoplast constituent is melamine and said carbonyl compound is formaldehyde.

* * * * *